US011570828B2

(12) United States Patent
Jimenez Cordon et al.

(10) Patent No.: US 11,570,828 B2
(45) Date of Patent: Jan. 31, 2023

(54) ENABLING FUNCTIONALITY AT A USER PLANE FUNCTION, UPF, BY A SESSION MANAGEMENT FUNCTION, SMF, IN A TELECOMMUNICATION NETWORK

(71) Applicant: Telefonaktiebolaget LM Ericsson (publ), Stockholm (SE)

(72) Inventors: Carlos Jimenez Cordon, Madrid (ES); Miguel Angel Muñoz De La Torre Alonso, Madrid (ES); Miguel Angel Puente Pestaña, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 79 days.

(21) Appl. No.: 17/259,044

(22) PCT Filed: Sep. 7, 2018

(86) PCT No.: PCT/EP2018/074172
§ 371 (c)(1),
(2) Date: Jan. 8, 2021

(87) PCT Pub. No.: WO2020/011384
PCT Pub. Date: Jan. 16, 2020

(65) Prior Publication Data
US 2021/0289566 A1    Sep. 16, 2021

(30) Foreign Application Priority Data
Jul. 12, 2018    (EP) .................................... 18382523

(51) Int. Cl.
*H04W 76/10*    (2018.01)
*H04L 9/40*    (2022.01)
(Continued)

(52) U.S. Cl.
CPC ......... *H04W 76/10* (2018.02); *H04L 63/1458* (2013.01); *H04W 12/12* (2013.01); *H04W 28/06* (2013.01)

(58) Field of Classification Search
CPC ..... H04W 24/02; H04W 76/10; H04W 12/12; H04W 28/06; H04W 28/0231; H04L 29/06; H04L 12/26
See application file for complete search history.

(56) References Cited

U.S. PATENT DOCUMENTS

| 2018/0199243 | A1* | 7/2018 | Bharatia | H04W 36/0011 |
| 2018/0199398 | A1* | 7/2018 | Dao | H04L 67/148 |
| 2020/0107213 | A1* | 4/2020 | Park | H04W 76/27 |

OTHER PUBLICATIONS

International Search Report and Written Opinion dated Mar. 26, 2019 for International Application No. PCT/EP2018/074172 filed on Sep. 7, 2018, consisting of 10-pages.
(Continued)

*Primary Examiner* — Iqbal Zaidi
(74) *Attorney, Agent, or Firm* — Christopher & Weisberg, P.A.

(57) ABSTRACT

A method of enabling functionality at a User Plane Function, UPF, by a Session Management Function, SMF, in a telecommunication network. The method includes receiving, by the UPF, a session creation/modification message for creating/modifying a session between the UPF and the SMF, wherein the session creation/modification message includes a session functionality indication for indicating functionality to be enabled for said session, and enabling, by the UPF, the functionality during the session between said UPF and the SMF.

12 Claims, 3 Drawing Sheets

(51) Int. Cl.
  *H04W 12/12* (2021.01)
  *H04W 28/06* (2009.01)

(56) References Cited

OTHER PUBLICATIONS

3GPP TT 23.726 V0.4.0; 3rd Generation Partnership Project; Technical Specification Group Services and System Aspects; Study on Enhancing Topology of SMF and UPF in 5G Networks (Release 16); Jun. 2018, consisting of 67-pages.

3GPP TS 29.244 V15.1.0; 3rd Generation Partnership Project; Technical Specification Group Core Network ans Terminals; Interface between the Control Plane and the User Plane Nodes; Stage 3 (Release 15); Mar. 2018, consisting of 170-pages.

SA WG2 Meeting #128 S2-187471; Title: Solution for 5G URLLC in 5G System; Source: Nokia, Nokia Shanghai Bell; Agenda Item: 6.20; Work Item/Release: FS_5G_URLLC/Rel-16; Document for: Approval; Date and Location: Jul. 2-6, 2018, Vilnius, LT, consisting of 6-pages.

* cited by examiner

ENABLING FUNCTIONALITY AT A USER PLANE FUNCTION, UPF, BY A SESSION MANAGEMENT FUNCTION, SMF, IN A TELECOMMUNICATION NETWORK

CROSS-REFERENCE TO RELATED APPLICATIONS

This application is a Submission Under 35 U.S.C. § 371 for U.S. National Stage Patent Application of International Application No.: PCT/EP2018/074172, filed Sep. 7, 2018 entitled "ENABLING FUNCTIONALITY AT A USER PLANE FUNCTION, UPF, BY A SESSION MANAGEMENT FUNTION, SMF, IN A TELECOMMUNICATION NETWORK," which claims priority to European Patent Application No.: 18382523.1, filed Jul. 12, 2018, entitled "ENABLING FUNCTIONALITY AT A USER PLANE FUNCTION, UPF, BY A SESSION MANAGEMENT FUNTION, SMF, IN A TELECOMMUNICATION NETWORK" the entireties of both of which are incorporated herein by reference.

TECHNICAL FIELD

The present disclosure relates to the enabling of functionality at a User Plane Function, UPF, and, more specifically, functionality that is enabled upon request of a Session Management Function, SMF, in a telecommunication network.

BACKGROUND

Control and user plane separation, CUPS, enables a flexible placement of the separated control plane and user plane functions for supporting diverse deployment scenarios such as a central or a distributed User Plane Function, UPF.

In The Fifth Generation, 5G, telecommunication network, CUPS refers to Session Management Function, SMF, and UPF network functions and to the N4 reference point between them, which is based on Packet Forwarding Control Protocol, PFCP.

The SMF controls the packet processing in the UPF by establishing, modifying or deleting PFCP Session contexts and by adding, modifying or deleting Packet Detection Rules, PDRs, Forwarding Action Rules, FARs, Quality of service Enforcement Rules, QERs, Usage Reporting Rules, URRs, and/or Buffering Action Rule, BAR, per PFCP session context, whereby an PFCP session context may correspond to an individual PDU session or a standalone PFCP session not tied to any PDU session.

Each PDR contains a Packet Data Inspection, PDI, that are one or more match fields against which incoming packets are matched, and may be associated to the following rules providing the set of instructions to apply to packets matching the PDI:
  one FAR, which contains instructions related to the processing of the packets, specifically forward, duplicate, drop or buffer the packet with or without notifying the CP function about the arrival of a DL packet
  zero, one, or more QERs, which contains instructions related to the QoS enforcement of the traffic;
  zero, one, or more URRs, which contains instructions related to traffic measurement and reporting.

In the current PFCP reporting solution SMF configures PDRs associated to URRs in UPF. When a packet matches a PDR, the reporting actions configured in the associated URRs are executed. The current reporting solution in PFCP is used for charging, so the metric defined in URR is traffic volume. It is reported along with the reporting time or event (for time and event-based charging).

In 5GC, the N4 interface between SMF and UPF will be based on the PCFP protocol. The current PFCP definition only allows to report volume from UPF to SMF. One of the drawbacks of the above is that the functionality that can be enabled at the UPF is fairly limited.

SUMMARY

An object of the present disclosure is to overcome the drawback as mentioned above.

In a first aspect of the present disclosure, there is provided a method of enabling functionality at a User Plane Function, UPF, by a Session Management Function, SMF, in a telecommunication network, wherein said method comprises the steps of:
  receiving, by said UPF, a session creation/modification message for creating/modifying a session between said UPF and said SMF, wherein said session creation/modification message comprises a session functionality indication for indicating functionality to be enabled for said session;
  enabling, by said UPF, said functionality during said session between said UPF and said SMF.

The above described solution allows the SMF to enable functionality at the UPF on a per session basis. The functionality is thus enabled as long as the session between the UPF and SMF is operational. The functionality is disabled whenever the session is stopped. As such the functionality is enabled during the lifetime of the session.

It was found that current solutions allow the functionality to be enabled on a per node basis and/or on a Packet Detection Rule, PDR, level. The inventors have found that it may be beneficial if the flexibility of the enabling process is increase, which is accomplished by the concept in that the functionality may also be enabled on a per session basis. The functionality may then, for example, be enabled on a per node basis, on a PDR level basis and on a per session basis. This allows for more flexibility.

It is noted that the enabled functionality is, for example, only enabled during the lifetime of the session. Whenever a session is timed out, terminated or ended using any other means, the functionality may be disabled again. A termination message may, for example, form a trigger for disabling the functionality that was previously enabled.

It is further noted that the functionality is local to the UPF. That is, it is functionality of which the UPF is able to process/perform/execute.

Local functionality in UPF refers to local functionality implemented in the UPF that will not be addressed as Service Functions. Imagine that you have UPF and you have designed an embedded solution to deal with DDoS. So, the present application is about to provide the flexibility to SMF to activate that functionality on per session.

The different functionalities that may be enabled are, for example:
  +-TcpRetransmissionHandling [0 . . . 1], and/or TCP Retransmissions and TCP DUPack reporting, allowing for a session to detect and report TCP retransmission and reporting;
  +-HTTPPipelining [0 . . . 1], i.e. HTTP Pipelining support, allowing to support this HTTP pipelining scenarios for a session, where several HTTP request can be sent from a Client without having a HTTP response being received;

+-Optimizations [0 . . . 1], i.e. Optimizations, allowing to support traffic optimization for this traffic session;

+-Tethering [0 . . . 1], i.e. Tethering, allowing to support Tethering for this traffic session. Tethering allows the detection of the mobile traffic that is using a UE Hot Spot to access the mobile network;

+-DDoS protection [0 . . . 1]—DDoS protection, that mitigates DDoS attacks.

In an example, the UPF comprises a list of profiles, wherein each profile comprises one or more possible functionalities that can be enabled for a session, wherein said step of receiving comprises:

receiving, by said UPF, said session functionality indication, wherein said session functionality indication comprises a particular profile among said list of profiles that is to be enabled for said session, and wherein said step of enabling comprises:

enabling, by said UPF, said one or more functionalities associated with said particular profile.

The advantage of the example as disclosed above is that the session creation/modification message may only need to comprise a particular profile identification, for example a "1", a "2" or anything a like. In such a case, the UPF knows which functionality it needs to enable for the particular session.

The identification may also be, for example, a "0" indicating that the UPF does not need to enable any functionality for the particular session.

The list of profiles may, for example, comprise any of:
a first profile comprising Distributed Denial of Service, DDoS, functionality;
a second profile comprising handling Traffic Optimization functionality.

In an example, the method further comprises the steps of:
transmitting, by said UPF, an acknowledgement message to said SMF for acknowledging that said UPF has enabled said functionality during said session between said UPF and said SMF.

The acknowledgement message may, for example, comprise an indication which profile is activated, i.e. which functionalities within a particular profile are enabled. The acknowledgement message may be a session establishment completion message indication that a particular session between the UPF and the SMF has been established.

In a further example, the step of enabling comprises:
performing, by said UPF, said enabled functionality for any packet that matches said session between said UPF and said SMF.

In order to do so, the UPF may determine whether any received packet matches the session that is established between the UPF and the SMF. Once it has been established that the incoming packet actually matches that particular session, i.e. it is associated with that particular session, the enabled functionality may be performed.

Preferably, the session is a Packet Forwarding Control Protocol, PFCP, session.

Such a PFCP session may utilize an N4 interface as specified in the 5G standard.

In a further example, the method further comprises the step of:
transmitting, by said UPF, to said SMF, a functionality indicator message for indicating a list of functionalities that said UPF can enable for a session between said UPF and said SMF.

The advantage of the example described above is that the functionalities that the UPF is able to perform are made available for the SMF. As such, the SMF has the choice in which functionalities it would like to be enabled for a particular session between the UPF and the SMF.

In a further example, the functionality indicator message is a Packet Forwarding Control Protocol, PFCP, Association Setup Request message.

In a second aspect of the present disclosure, there is provided a User Plane Function, UPF, arranged for enabling functionality requested by a Session Management Function, SMF, in a telecommunication network, wherein said UPF comprises:

receive equipment arranged for receiving a session creation/modification message for creating/modifying a session between said UPF and said SMF, wherein said session creation/modification message comprises a session functionality indication for indicating functionality to be enabled for said session;

process equipment arranged for enabling said functionality during said session between said UPF and said SMF.

The advantages of the first aspect of the disclosure being a method of enabling functionality at a User Plane Function, UPF, are also inherently a part of the second aspect of the disclosure. Furthermore, it is pointed out that although the claims read as if all the modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

Further, it is noted that the equipment may also be referred to as a module, unit, device or anything alike.

In an example, the UPF comprises a list of profiles, wherein each profile comprises one or more possible functionalities that can be enabled for a session, wherein said receive equipment is further arranged for:

receiving said session functionality indication, wherein said session functionality indication comprises a particular profile among said list of profiles that is to be enabled for said session, and wherein said process equipment is further arranged for:

enabling said one or more functionalities associated with said particular profile.

In a further example, the list of profiles comprises any of:
a first profile comprising Distributed Denial of Service, DDoS, functionality;
a second profile comprising handling Traffic Optimization functionality.

In another example, the UPF further comprises:
transmit equipment arranged for transmitting an acknowledgement message to said SMF for acknowledging that said UPF has enabled said functionality during said session between said UPF and said SMF.

In a further example, the process equipment is further arranged for
performing said enabled functionality for any packet that matches said session between said UPF and said SMF.

In yet another example, the session is a Packet Forwarding Control Protocol, PFCP, session.

In a further example, the UPF comprises:
transmit equipment arranged for transmitting, to said SMF, a functionality indicator message for indicating a list of functionalities that said UPF can enable for a session between said UPF and said SMF.

In yet another example, the functionality indicator message is a Packet Forwarding Control Protocol, PFCP, Association Setup Request message.

In a third aspect of the present disclosure, there is provided a computer program product comprising a computer readable medium having instructions stored thereon which, when executed by a User Plane Function, UPF, accomplish said UPF to implement a method in accordance with any of examples in accordance with the method as disclosed above.

In this aspect of the disclosure, a computer readable storage medium is provided with instructions that enable a system onto which said storage medium has been loaded to perform the method according to the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
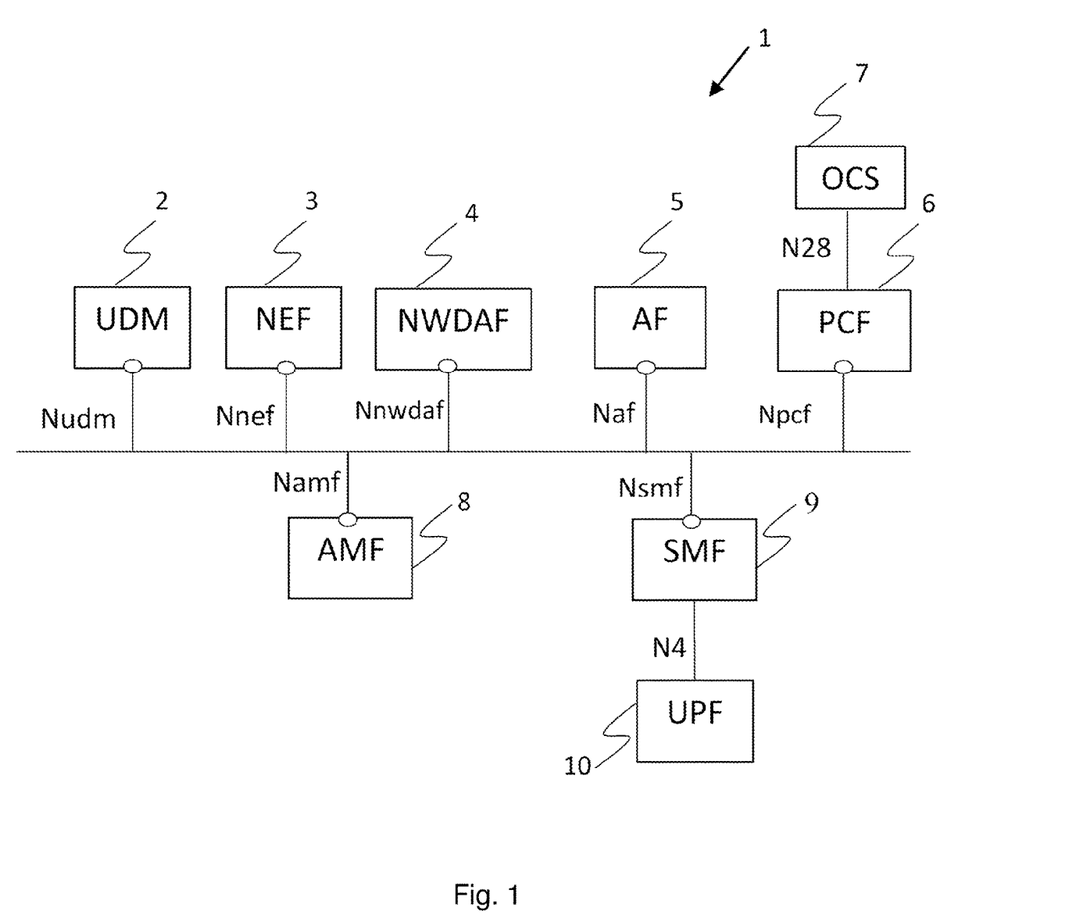
FIG. 1 schematically illustrates a part of the architecture of a Fifth Generation, 5G, telecommunication network.

FIG. 1 schematically illustrates part of the reference architecture 1 of a fifth generation, 5G, Service Based Architecture, SBA, telecommunication network, according to the prior art. The 5G system architecture comprise the following Network Functions, NFs:
Access and Mobility Management Function, AMF, 8
Network Exposure Function, NEF, 3
Policy Control Function, PCF, 6
Session Management Function, SMF, 9
Unified Data Management, UDM, 2
User Plane Function, UPF, 10
Application Function, AF, 5
Network Data Analytics Function, NWDAF, 4
Online Charging System, OCS, 7.

A functional description of these network functions is specified in clause 6 of the Third Generation Partnership Project, 3GPP, standard 23.501, "System Architecture for the 5G system", the contents of which are included herein, by reference.

Figure 2:
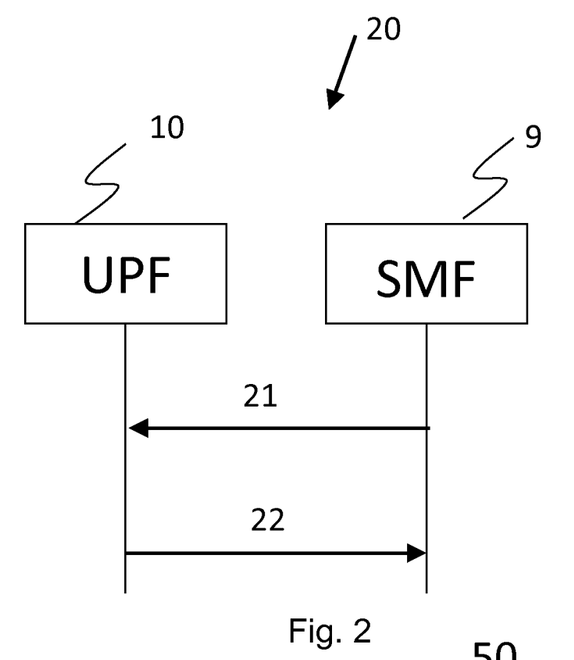
FIG. 2 schematically illustrates a method of enabling functionality at a User Plane Function, UPF.

FIG. 2 schematically illustrates a method 20 of enabling functionality at a User Plane Function, UPF 10.

The method is directed to the concept of enabling functionality at a User Plane Function, UPF, 10 by a Session Management Function, SMF, 9 in a telecommunication network.

The method 20 comprises the steps of:
receiving 21, by said UPF 10, a session creation/modification message for creating/modifying a session between said UPF 10 and said SMF 9, wherein said session creation/modification message comprises a session functionality indication for indicating functionality to be enabled for said session;
enabling, by said UPF 10, said functionality during said session between said UPF 10 and said SMF 9.
transmitting 22, by said UPF 10, to said SMF an acknowledgement that said functionality is enabled.

Here below, a more specific description is provided of the present disclosure.

Upon Protocol Data Unit, PDU, session establishment, the SMF may send a PFCP Session Establishment Request message to the UPF. In case the SMF intends to enable certain functionality, e.g. TTL identification and DDoS features, at the UPF on a per PFCP session basis, it is proposed to include a new "Activate UPF Profile" information element, see the last element in the table here below.

| Information elements | P | Condition/Comment | Appl. | | | | IE Type |
|---|---|---|---|---|---|---|---|
| | | | Sxa | Sxb | Sxc | N4 | |
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session. Several IEs with the same IE type may be present to represent multiple PDRs. See Table 7.5.2.2-1. | X | X | X | X | Create PDR |
| Create FAR | M | This IE shall be present for at least one FAR to be associated to the PFCP session. Several IEs with the same IE type may be present to represent multiple FARs. See Table 7.5.2.3-1. | X | X | X | X | Create FAR |
| Create URR | C | This IE shall be present if a measurement action shall be applied to packets matching one or more PDR(s) of this PFCP session. Several IEs within the same IE type may be present to represent multiple URRs. See Table 7.5.2.4-1. | X | X | X | X | Create URR |
| Create QER | C | This IE shall be present if a QoS enforcement action shall be applied to packets matching one or more PDR(s) of this PFCP session. Several IEs within the same IE type may be present to represent multiple QERs. See Table 7.5.2.5-1. | — | X | X | X | Create QER |
| Create BAR | O | When present, this IE shall contain the buffering instructions to be applied by the UP function to any FAR of this PFCP session set with the Apply Action requesting | X | — | — | X | Create BAR |

-continued

| Information elements | P | Condition/Comment | Sxa | Sxb | Sxc | N4 | Appl. IE Type |
|---|---|---|---|---|---|---|---|
| | | the packets to be buffered and with a BAR ID IE referring to this BAR. See table 7.5.2.6-1. | | | | | |
| Create Traffic Endpoint | C | This IE may be present if the UP function has indicated support of PDI optimization. Several IEs within the same IE type may be present to represent multiple Traffic Endpoints. See Table 7.5.2.7-1. | X | X | X | X | Create Traffic Endpoint |
| PDN Type | C | This IE shall be present if the PFCP session is setup for an individual PDN connection or PDU session (see subclause 5.2.1). When present, this IE shall indicate whether this is an IP or non-IP PDN connection/PDU session or, for SGC, an Ethernet PDU session. | X | X | — | X | PDN Type |
| SGW-C FQ-CSID | C | This IE shall be included according to the requirements in clause 23 of 3GPP TS 23.007 [24]. | X | X | — | | FQ-CSID |
| MME FQ-CSID | C | This IE shall be included when received on the S11 interface or on S5/S8 interface according to the requirements in clause 23 of 3GPP TS 23.007 [24]. | X | X | — | — | FQ-CSID |
| PGW-C FQ-CSID | C | This IE shall be included according to the requirements in clause 23 of 3GPP TS 23.007 [24]. | X | X | — | — | FQ-CSID |
| ePDG FQ-CSID | C | This IE shall be included according to the requirements in clause 23 of 3GPP TS 23.007 [24]. | — | X | — | — | FQ-CSID |
| TWAN FQ-CSID | C | This IE shall be included according to the requirements in clause 23 of 3GPP TS 23.007 [24]. | — | X | — | — | FQ-CSID |
| User Plane Inactivity Timer | O | This IE may be present to request the UP function to send a User Plane Inactivity Report when no user plane packets are received for this PFCP session for a duration exceeding the User Plane Inactivity Timer. When present, it shall contain the duration of the inactivity period after which a User Plane Inactivity Report shall be generated. | — | X | X | X | User Plane Inactivity Timer |
| Activate UPF Profile | C | This IE shall be present if UPF Profile shall be activated for this session. When present this IE shall contain the name of the UPF profile. Several IEs with the same IE type may be present to represent multiple UPF Profile names. | X | X | X | X | Activate UPF Profile |

As a precondition for the above, the UPF may be locally configured with:
- a first profile comprising Distributed Denial of Service, DDoS, functionality;
- a second profile comprising handling Traffic Optimization functionality.

When the UPF receives the "Activate UPF Profile" Information Element, IE, set to "Profile1", the UPF may DDoS features for any packet that matches the PCFP session.

The "Activate UPF Profile" IE can be a string which indicates the name of the profile, or alternatively it may include a list of features, or it may indicate a particular number which can be correlated, by the UPF, with a particular profile. The UPF may send a PFCP Session Establishment Response message to the SMF.

In case the SMF intends to add/modify/remove certain functionality at UPF during the PFCP session, the same IE is proposed to be added in the PFCP Session Modification Request message.

In this particular case, when the UPF receives the "ActivateUPFProfile" IE set to "Profile2", UPF will enable Traffic Optimization functionality for any packet that matches the PCFP session. Note in this example, DDoS was previously enabled and UPF may need to disable TTL identification.

Finally, not shown in the sequence diagrams, as the UPF Profile refers to functionality supported by the UPF, optionally it is proposed to extend the existing mechanism to report UPF capabilities, i.e. at PFCP Association Setup Request message, with new capabilities related to the corresponding functionality. This would allow SMF to know which UPFs support this capability and thus can influence on UPF selection. As current 3GPP "UP Function Features" IE takes the form of a bitmask where each bit set indicates that the corresponding feature is supported, and this will not scale properly, we propose to extend it with a list of feature-IDs instead of a bitmask. This would allow the PFCP Association procedure to support extended functionality (e.g. proprietary features) more easily.

Figure 3:
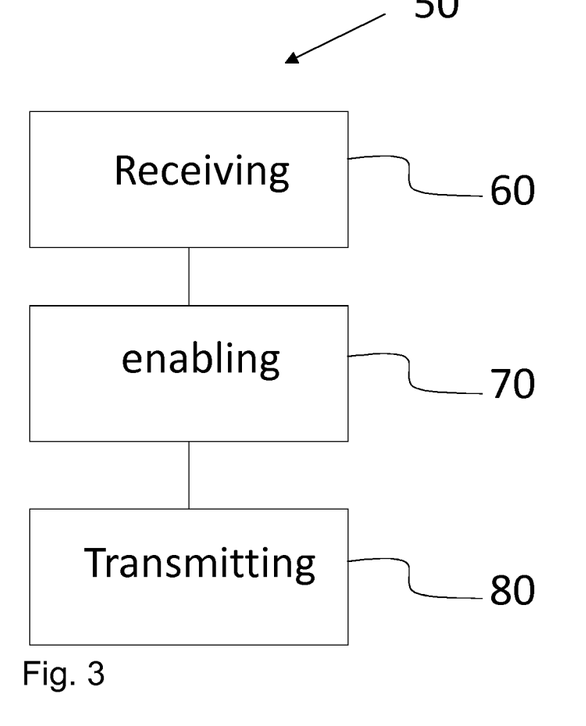
FIG. 3 schematically illustrates a method of enabling functionality at a User Plane Function, UPF FIG. 4 schematically illustrates a User Plane Function, UPF, according to the present disclosure.

FIG. 3 schematically illustrates a method 50 of enabling functionality at a User Plane Function, UPF, wherein the method 50 comprises the receiving step 60, the enabling step 70 and the transmitting step 80.

Figure 4:
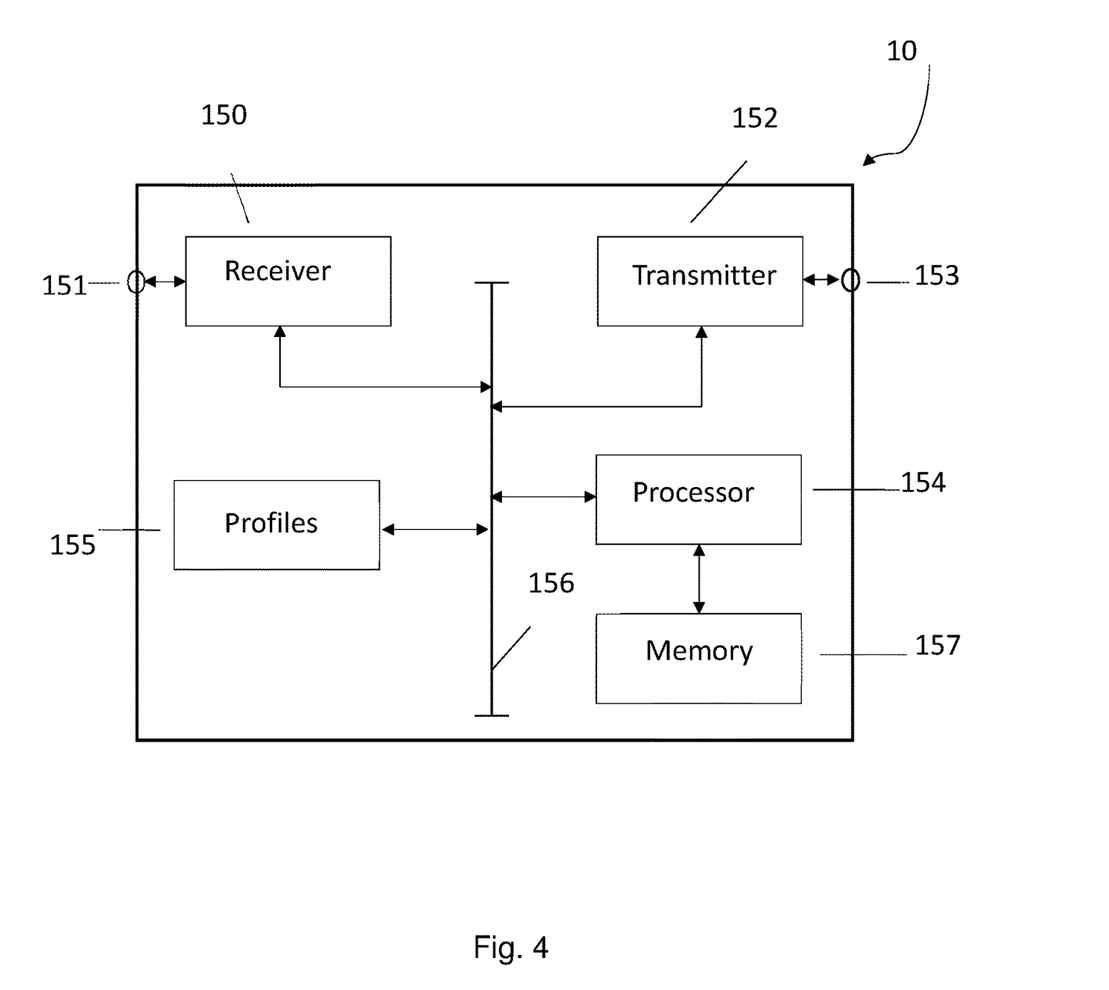

FIG. 4 schematically illustrates a User Plane Function, UPF, according to the present disclosure.

A User Plane Function, UPF, 10 arranged for enabling functionality requested by a Session Management Function, SMF, in a telecommunication network.

The UPF comprises:
receive equipment 150, or receiving module, is arranged for receiving a session creation/modification message for creating/modifying a session between said UPF and said SMF, wherein said session creation/modification message comprises a session functionality indication for indicating functionality to be enabled for said session;
process equipment 154, or the processor, is arranged for enabling said functionality during said session between said UPF and said SMF.

The UPF 10 further comprises a list of profiles 155, which list of profiled comprises profiles which the UPF 10 is able to activate. That is, each profile may contain functionalities which the UPF 10 is able to enable.

The processor 154 is further connected to a memory 157, and is connected to the receiver 151, the profiles 155, the transmitter 152 via a bus 156.

Finally, the receiver 150 is able to receive packets via the receiving terminal 151 and the transmitter 152 is able to transmit packets via the transmitting terminal 153.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of enabling functionality at a User Plane Function, UPF, by a Session Management Function, SMF, in a telecommunication network, the UPF comprising a list of profiles, each profile comprising one or more possible functionalities that can be enabled for a session, the method comprising:
   receiving, by the UPF, a session creation/modification message for creating/modifying a session between the UPF and the SMF, the session creation/modification message comprising a session functionality indication for indicating functionality to be enabled for the session, and the session functionality indication comprises a particular profile among the list of profiles that is to be enabled for the session;
   enabling, by the UPF the one or more functionalities associated with the particular profile during the session between the UPF and the SMF;
   transmitting, by the UPF, an acknowledgement message to the SMF for acknowledging that the UPF has enabled the functionality during the session between said UPF and the SMF; and
   the session is a Packet Forwarding Control Protocol, PFCP, session.

2. The method in accordance with claim 1, wherein the receiving comprises:
   receiving, by the UPF, the session functionality indication, wherein the session functionality indication comprises a particular profile among the list of profiles that is to be enabled for the session,
   and wherein the enabling comprises:
   enabling, by the UPF, the one or more functionalities associated with said particular profile.

3. The method in accordance with claim 2, wherein the list of profiles comprises any of:
   a first profile comprising Distributed Denial of Service, DDoS, functionality; and
   a second profile comprising handling Traffic Optimization functionality.

4. The method in accordance with claim 1, wherein the enabling comprises:
   performing, by the UPF, the enabled functionality for any packet that matches the session between the UPF and the SMF.

5. The method in accordance with claim 1, wherein the method further comprises:
   transmitting, by the UPF, to the SMF, a functionality indicator message for indicating a list of functionalities that the UPF can enable for a session between the UPF and the SMF.

6. The method in accordance with claim 5, wherein the functionality indicator message is a Packet Forwarding Control Protocol, PFCP, Association Setup Request message.

7. A User Plane Function, UPF, arranged for enabling functionality requested by a Session Management Function, SMF, in a telecommunication network, the UPF comprising a list of profiles, each profile comprising one or more possible functionalities that can be enabled for a session, the UPF comprising:
   receive equipment configured to receive a session creation/modification message for creating/modifying a session between the UPF and the SMF, the session creation/modification message comprising a session functionality indication for indicating functionality to be enabled for the session and the session functionality indication comprising a particular profile among the list of profiles that is to be enabled for the session;
   process equipment configured to enable the one or more functionalities associated with the particular profile during the session between the UPF and the SMF;
   transmit equipment configured to transmit an acknowledgement message to said SMF for acknowledging that the UPF has enabled the functionality during the session between the UPF and the SMF; and
   the session is a Packet Forwarding Control Protocol, PFCP, session.

8. The UPF in accordance with claim 7, wherein the list of profiles comprises any of:
   a first profile comprising Distributed Denial of Service, DDoS, functionality; and
   a second profile comprising handling Traffic Optimization functionality.

9. The UPF in accordance with claim 7, wherein the process equipment is further configured to
   perform the enabled functionality for any packet that matches the session between said UPF and said SMF.

10. The UPF in accordance with claim 7, wherein the UPF comprises:
    transmit equipment configured to transmit, to the SMF, a functionality indicator message for indicating a list of functionalities that the UPF can enable for a session between the UPF and the SMF.

11. The UPF in accordance with claim 10, wherein the functionality indicator message is a Packet Forwarding Control Protocol, PFCP, Association Setup Request message.

12. A non-transitory computer storage medium storing a computer program having instructions which, when executed by a User Plane Function, UPF, cause the UPF to implement a method of enabling functionality at the UPF by a Session Management Function, SMF, in a telecommunication network, the UPF comprising a list of profiles, each profile comprising one or more possible functionalities that can be enabled for a session, the method comprising:
- receiving, by the UPF, a session creation/modification message for creating/modifying a session between the UPF and the SMF, the session creation/modification message comprising a session functionality indication for indicating functionality to be enabled for the session, and the session functionality indication comprising a particular profile among the list of profiles that is to be enabled for the session;
- enabling, by the UPF, the one or more functionalities associated with the particular profile during the session between the UPF and the SMF;
- transmitting, by the UPF, an acknowledgement message to the SMF for acknowledging that the UPF has enabled the functionality during the session between said UPF and the SMF; and
- the session being a Packet Forwarding Control Protocol, PFCP, session.

\* \* \* \* \*